(12) United States Patent
England et al.

(10) Patent No.: US 7,621,670 B1
(45) Date of Patent: Nov. 24, 2009

(54) UNBALANCED-FLOW, FLUID-MIXING PLUG WITH METERING CAPABILITIES

(75) Inventors: John Dwight England, Arab, AL (US); Anthony R. Kelley, Somerville, AL (US); Paul D. Van Buskirk, Humble, TX (US)

(73) Assignee: The United States of America as represented by the National Aeronautica and Space Administration, Washington, DC (US)

( * ) Notice: Subject to any disclaimer, the term of this patent is extended or adjusted under 35 U.S.C. 154(b) by 0 days.

(21) Appl. No.: 12/392,867

(22) Filed: Feb. 25, 2009

(51) Int. Cl.
*B01F 5/06* (2006.01)
(52) U.S. Cl. .................................... 366/340; 138/40
(58) Field of Classification Search ............ 366/176.1, 366/181.5, 336, 340, 341, DIG. 1, DIG. 2, 366/DIG. 3; 48/189.4; 138/37–40, 42, 44
See application file for complete search history.

(56) References Cited

U.S. PATENT DOCUMENTS

| | | | | |
|---|---|---|---|---|
| 3,582,048 A | * | 6/1971 | Sarem | 366/340 |
| 3,583,678 A | * | 6/1971 | Harder | 366/340 |
| 4,971,450 A | * | 11/1990 | Gerich | 366/340 |
| 5,341,848 A | * | 8/1994 | Laws | 138/44 |
| 5,529,093 A | * | 6/1996 | Gallagher et al. | 138/44 |
| 6,145,544 A | * | 11/2000 | Dutertre et al. | 138/39 |
| 6,186,179 B1 | * | 2/2001 | Hill | 138/39 |
| 7,051,765 B1 | * | 5/2006 | Kelley et al. | 138/44 |

FOREIGN PATENT DOCUMENTS

| | | | |
|---|---|---|---|
| GB | 2235064 A | * | 2/1991 |
| JP | 2009-112891 | * | 5/2009 |

* cited by examiner

*Primary Examiner*—Charles E Cooley
(74) *Attorney, Agent, or Firm*—James J. McGroary; Peter J. Van Bergen

(57) ABSTRACT

A fluid mixer plug has holes formed therethrough such that a remaining portion is closed to fluid flow. The plug's inlet face defines a central circuit region and a ring-shaped region with the ring-shaped region including at least some of the plug's remaining portion so-closed to fluid flow. This remaining portion or closed region at each radius R of the ring shaped region satisfies a radius independent, flow-based relationship. Entry openings are defined in the plug's inlet face in correspondence with the holes. The entry openings define an open flow area at each radius of the ring-shaped region. The open flow area at each such radius satisfies the inverse of the flow-based relationship defining the closed regions of the plug.

14 Claims, 5 Drawing Sheets

UNBALANCED-FLOW, FLUID-MIXING PLUG WITH METERING CAPABILITIES

ORIGIN OF THE INVENTION

The invention was made in part by an employee of the United States Government and may be manufactured and used by or for the Government for governmental purposes without the payment of any royalties thereon or therefor.

BACKGROUND OF THE INVENTION

1. Field of the Invention

This invention relates to fluid mixing in a conduit. More specifically, the invention is a fluid-mixing plug with holes that can generate an unbalanced fluid flow distribution at the inlet face of the plug so that the fluid is mixed as it exits the holes in the plug.

2. Description of the Related Art

There are many conduit-constrained fluid flow applications that require fluid mixing and, possibly, measurement of fluid attributes. Such applications include chemical processing, a wide variety of manufacturing processes, and mechanical processes (e.g., hydraulic systems) that utilize fluid flow. With respect to fluid mixing, mixers without moving parts or power requirements are preferred. With respect to measurement of fluid attributes, it is preferred that the measurement system not disturb the fluid flow. Satisfaction of both of these preferences has proven elusive when both fluid mixing and measurement of fluid attributes are required.

SUMMARY OF THE INVENTION

Accordingly, it is an object of the present invention to provide a fluid mixer.

Another object of the present invention is to provide a fluid mixer having no moving parts or power requirements.

Still another object of the present invention is to provide a fluid mixer that is readily instrumented for measurement of fluid attributes.

Other objects and advantages of the present invention will become more obvious hereinafter in the specification and drawings.

In accordance with the present invention, a fluid mixer plug has holes formed therethrough such that a remaining portion is closed to fluid flow. The plug is fitted in a conduit supporting a fluid flow. The plug extends across a transverse portion of the conduit, and sequentially defines (i) an inlet face, (ii) a plug body, and (iii) an outlet face. Consequently, the fluid flow sequentially passes through the inlet face, the plug body and the outlet face. The inlet face defines a central circular region and a ring-shaped region. The ring-shaped region includes at least some of the plug's remaining portion so-closed to fluid flow. This remaining portion at each radius R of the ring shaped region satisfies a radius independent, flow-based relationship $$A_R = a/(X_R V_R^b)$$

where $A_R$ is a sum of areas of the remaining portion centered at radius R, $X_R$ is a flow coefficient at radius R that is equal to $(\rho K)_R$ where $\rho_R$ is a density of a fluid that could flow through the conduit at radius R and $K_R$ is a flow correction factor associated with the fluid that could flow through the conduit at radius R, $V_R$ is a velocity of the fluid that could flow through the conduit at radius R, b is a constant selected to make at least one process variable, associated with the fluid that is to flow through the conduit, approximately equal at each radius R, and a is a constant that is equal to $(X_R A_R V_R^b)$ at said radius R.

A plurality of entry openings are defined in the inlet face in correspondence with the holes. The entry openings define an open flow area at each radius R of the ring-shaped region defined as $A'_R$, where $$A'_R = A_{Pipe} - A_R,$$

with $A_{Pipe}$ being the cross-sectional area of the conduit at the plug. For each entry opening at each radius R of the ring-shaped region where R<M, the open flow area at radius R is greater than that at a radius $R_{Smaller}$ where $R_{Smaller}$<R. However, for each entry opening at each radius R of the ring-shaped region where R>M, the open flow area at radius R is less than that at a radius $R_{Larger}$ where $R_{Larger}$>R. Here, M is a radius in the range of approximately $(0.4)R_{Pipe}$ to $(0.97) R_{Pipe}$ where $R_{Pipe}$ is the radius of the conduit.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

The present invention is a fluid mixer that causes mixing of a conduit-constrained fluid flow. In general, the fluid mixer is a plug having holes formed therethrough with the plug being installed in a fluid-carrying conduit such that the fluid passes through the plug's holes. All fluid flowing through conduit must pass through plug's holes. As used herein, the term "plug" includes any structural element (e.g., thin plate, disk, block, cork-like element, etc.) having a hole pattern formed therethrough. In accordance with the present invention, the hole pattern at the plug's inlet face causes the fluid to mix at the plug's exit. The fluid mixer can be used solely for fluid mixing purposes, but can also be configured for instrumentation such that the fluid mixer also serves as a flowmeter. The fluid mixer is also compatible with existing fittings and current measurement systems and, therefore, does not require special piping, instrumentation, or calculation method changes.

Figure 1:
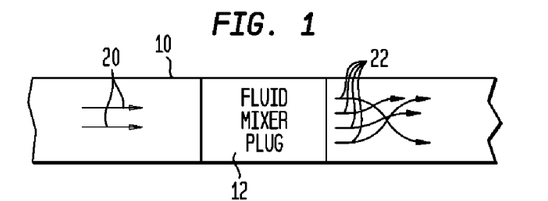
FIG. 1 is a schematic view of a conduit having a fluid mixer installed therein in a typical installation configuration.

Referring now to the drawings, and more particularly to FIG. 1, a typical installation configuration using the fluid mixer of the present invention is shown. As mentioned above, the fluid mixer described herein can be used to simply cause mixing in a fluid flow, but can also be used as part of a flowmeter designed to measure one or more process variables associated with a fluid flow. The term "fluid" as used herein refers to any flowable substance to include vapors or gas, homogenous or non-homogenous liquids and slurries.

In FIG. 1, a pipe or conduit 10 has a fluid mixer plug 12 fitted therein. A fluid flow (represented by arrows 20) moves through conduit 10 and impinges on the upstream side of fluid mixer plug 12. Fluid mixer plug 12 is positioned transverse or perpendicular to flow 20. Fluid mixer plug 12 can be shaped to conform to a straight or curved portion of conduit 10 without departing from the scope of the present invention.

As will be explained further below, fluid exiting fluid mixer plug 12 mixes as indicated by arrows 22. Briefly, the present invention provides unique criteria governing the holes at inlet face 12A of fluid mixer plug 12 that results in mixing 22 just downstream of plug 12. In general, the holes at inlet face 12A cause the incoming fluid flow 20 to become unbalanced at inlet face 12A. The criteria that provides for this general result will be described in detail later herein. The unbalanced flow created at inlet face 12A causes mixing as the flow moves through and then exits plug 12.

Figure 2A:
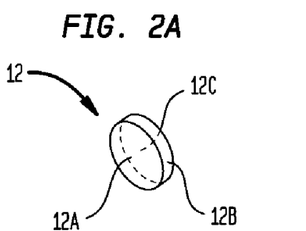
FIG. 2A is an isolated perspective view of a circular disk or plate embodiment of a fluid mixer illustrating the general exterior construction thereof for use in a conduit having a circular cross-section.
Figure 2B:
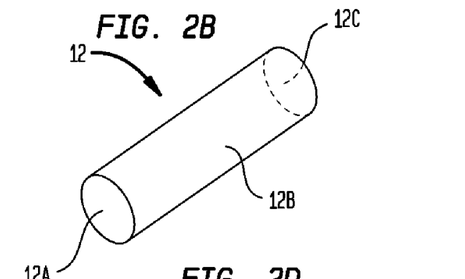
FIG. 2B is an isolated perspective view of a circular cylinder embodiment of a fluid mixer illustrating the general exterior construction thereof for use in a conduit having a circular cross-section.

Fluid mixer plug 12 can be sized/shaped to work with any size/shape of conduit 10. For example, fluid mixer plug 12 can be a circular plate or disk (FIG. 2A) or a circular cylinder (FIG. 2B) for installation in a cylindrical conduit, or could be a rectangular plate or disk (FIG. 2C) or a rectangular block (FIG. 2D) for installation in a conduit having a rectangular cross-section. Thus, in general, fluid mixer plug 12 can be shaped/sized to fit within any fluid-carrying conduit without departing from the scope of the present invention. Further, the term "plug" as used herein includes a simple element fitted into a conduit as well as a flanged element fitted between the ends of two joined conduits where the flanged element has a plug portion that fills an interior cross-section of the two joined conduits.

Regardless of its shape/size, the portion of fluid mixer plug 12 fitted in a fluid-carrying conduit is defined by its inlet face 12A, a plug body 12B, and an outlet face 12C. The particular thickness of plug body 12B is not a limitation of the present invention as it is very small when "plug" 12 is a thin plate or disk element, while it is larger when "plug" 12 is a block or cork-like element. An incoming fluid flow (e.g., fluid flow 20 in FIG. 1) will impinge upon inlet face 12A, pass through fluid-entry holes (not shown) provided through inlet face 12A, pass through hole pathways (not shown) provided in plug body 12B, and pass through corresponding fluid-exit holes (not shown) provided through outlet face 12C where the fluid flow mixes (e.g., mixing 22 in FIG. 1).

In accordance with the present invention, the fluid-entry holes provided in inlet face 12A must cause an unbalanced flow distribution at inlet face 12A to insure mixing in and after plug 12. The present invention's unbalanced flow distribution condition criteria is adapted from the balanced flow principles for a simple orifice plate as disclosed in U.S. Pat. No. 7,051, 765, the entire contents of which are hereby incorporated by reference.

Figures 2C, 2D, 3:
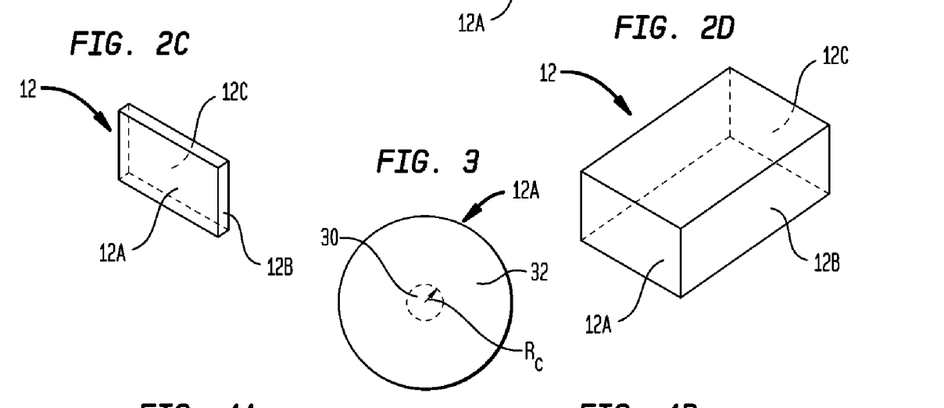
FIG. 2C is an isolated perspective view of a rectangular disk or plate embodiment of a fluid mixer illustrating the general exterior construction thereof for use in a conduit having a rectangular cross-section.
FIG. 2D is an isolated perspective view of a rectangular block embodiment of a fluid mixer illustrating the general exterior construction thereof for use in a conduit having a rectangular cross-section.
FIG. 3 is a plan view of a circular inlet face of a fluid mixer of the present invention.
Figure 4A:
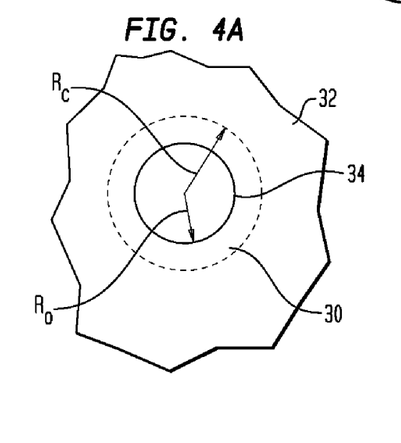
FIG. 4A is an enlarged plan view of a portion of an inlet face illustrating a single hole in the inlet face's central circular region.
Figure 4B:
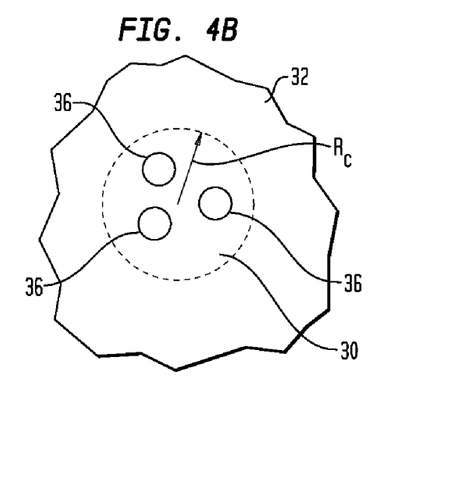
FIG. 4B is an enlarged plan view of a portion of an inlet face illustrating multiple holes in the inlet face's central circular region.

Referring now to FIG. 3, a circular inlet face 12A is illustrated. As mentioned above, it is to be understood that the shape/size of inlet face 12A is not a limitation of the present invention. Regardless of its exterior shape/size, fluid mixer plug 12 has a central circular region 30 having a radius $R_C$, and an unbalanced flow region 32 that starts at the perimeter of central circular region 30 and ends at the perimeter of inlet face 12A that will also be commensurate with the inner boundary of the conduit supporting the fluid mixer plug. The configuration of central circular region 30 is not a limitation of the present invention. Accordingly, central circular region 30 can be solid (i.e., no holes) as illustrated in FIG. 3, can have a single hole 34 of radius $R_0$, where $R_0 \leq R_C$, formed therethrough as shown in FIG. 4A, or can have multiple holes 36 formed therethrough as shown in FIG. 4B.

The unbalanced-flow-creating through-hole area-distribution of inlet face 12A is formed in unbalanced flow region 32. In accordance with the present invention, an inlet face's through-hole area-distribution for unbalanced flow region 32 is defined as the inverse of an area distribution that follows or satisfies the general relationship $$A_R = a/(X_R V_R^b) \qquad (1)$$

where, in general, $A^R$ is the sum of areas referenced to a radius R originating at the center of central circular region 30 and terminating within unbalanced flow region 32, and representing the "closed" or solid portion of the plug that blocks movement of a fluid flow therethrough;

$X_R$ is a flow coefficient at radius R that is equal to $(\rho K)_R$ where $\rho_R$ is a density of a fluid that could flow through a conduit at radius R thereof, and $K_R$ is a flow correction factor associated with one of the fluid's momentum, kinetic energy, energy density, volumetric flow, mass flow, Reynold's number, etc., for the fluid that could flow through the conduit at radius R, $V_R$ is a velocity of the fluid that could flow through the conduit at radius R where the velocity follows a known distribution function that is based upon factors to include the particular fluid at issue, conduit size/shape, etc., as is known in the art, b is a constant selected to make at least one process variable, (that is associated with the fluid that is to flow through the conduit) equal or "balanced" at each radius R where b can be any value, but typically ranges from −5 to +5 (e.g., b typically is 1 when balancing mass, b is typically 2 when balancing momentum or velocity head although a different flow correction factor K may be used in each case, etc.), and a is a constant that is equal to $(X_R A_R V_R^b)$ at each radius R.

With $A_R$ defining the closed regions of unbalanced flow region 32 at inlet face 12A, $A'_R$ defines the inverse "open" flow area of the inlet face in unbalanced flow region 32 and can be written as:

$$A'_R = A_{R(Pipe)} - A_R \qquad (2)$$

where $A_{R(Pipe)}$ represents the cross-sectional area of conduit 10 at radius R.

To assure an unbalanced flow distribution at inlet face 12A, the following constraint must also be satisfied. Specifically, for the holes in region 32 at each radius R where R<M, the sum of the hole areas at radius R is greater than that at radius $R_{Smaller}$ where $R_{Smaller}$ lies in region 32 and $R_{Smaller}$<R, and for the holes at each radius R where R>M, the sum of the holes at radius R is less than that at radius $R_{Larger}$ where $R_{Larger}$>R. Here, M is defined as a midpoint radius in the range of approximately $(0.4)R_{Pipe}$ to $(0.97)R_{Pipe}$ where $R_{Pipe}$ is the radius of conduit 10. Thus, in general, the summed hole area in region 32 generally increases to some midpoint radius M, then decreases as radius increases to the full radius of conduit 10 or $R_{Pipe}$.

The calculation of the closed areas at radius R (or $A_R$) and subsequently the open-flow areas at radius R (or $A'_R$) are iterative processes used to optimize mixing and to dictate the pressure loss of the mixing plug in accordance with the following well known relationship $$\beta = (A_R^2 / A_{Pipe}^2)^{1/2} \qquad (3)$$

where β represents the closed area to pipe area ratio to the 1/2 power, and $A_{Pipe}$ is the area of the flow conduit.

To determine the open area relationship or β', the following conversion is made $$\beta' = (A'_R{}^2 / A_{Pipe}^2)^{1/2} \qquad (4)$$

or $$\beta' = ((A_{Pipe} - A_R)^2 / A_{Pipe}^2)^{1/2} \qquad (5)$$

where β' is the open area to pipe area ratio to the 1/2 power.

The sum of closed areas $A_R$ is defined differently depending on the structure of the hole pattern that, in general, falls into two different categories. The first category refers to holes (e.g., circular holes, slotted holes in the shape of an arc of a circle, etc.) having their centers located on a radius R. That is, the holes are discrete holes formed in and fully bounded within unbalanced flow region 32. The second category refers to the area of all holes that are defined just at a radius R where each such hole extends continuously from the perimeter of central circular region 30 to the perimeter of inlet face 12A. Examples of each category will be provided herein.

Regardless of the category of hole pattern structure, the ratio of total orifice flow area $A_{Total}$ provided at inlet face 12A to the conduit's flow area $A_{Pipe}$ may be determined from the following well known orifice equations, $$A_{Total}/A_{Pipe} = (1+Q)^{-1/2} \qquad (6)$$

and $$Q = 2G_c \rho \Delta P (C_o Y A_{Pipe}/M_{FR})^2 \qquad (7)$$

where $G_c$ is Newton's conversion constant,

ρ is the fluid density,

ΔP is the differential pressure measure between a location at or upstream of the inlet face to a location downstream of the inlet face, $C_o$ is the orifice coefficient, Y is an expansion factor typically applied to compressible fluids, and $M_{FR}$ is the mass flow rate.

Equations (6) and (7) are straightforward derivations from the orifice meter equations described in detail by McCabe et et. in "Unit Operations of Chemical Engineering, Fifth Edition," McGraw-Hill, Inc., New York, 1983, p. 222, the contents of which are hereby incorporated by reference. It is to be understood that other methods may be used to determine flow rate without departing from the scope of this invention.

Using the total orifice flow area $A_{Total}$, the sum of the orifice areas of unbalanced flow region 32 is specified by $$A_{Total} - A_{R0} = A'_{R1} + A'_{R2} + \ldots + A'_{Rn} \qquad (8)$$

where $A_{R0}$ is (i) zero when there is no hole in central circular region 30, (ii) $2\pi R_0$ when there is a single hole of radius $R_0$ in central circular region 30, and (iii) the sum of all areas associated with multiple holes in center circular region 30. A single hole in central circular region 30 can have any radius up to and including $R_C$. The presence or absence of a hole or holes in circular central region 30 is not a limitation of the present invention.

Figure 5A:
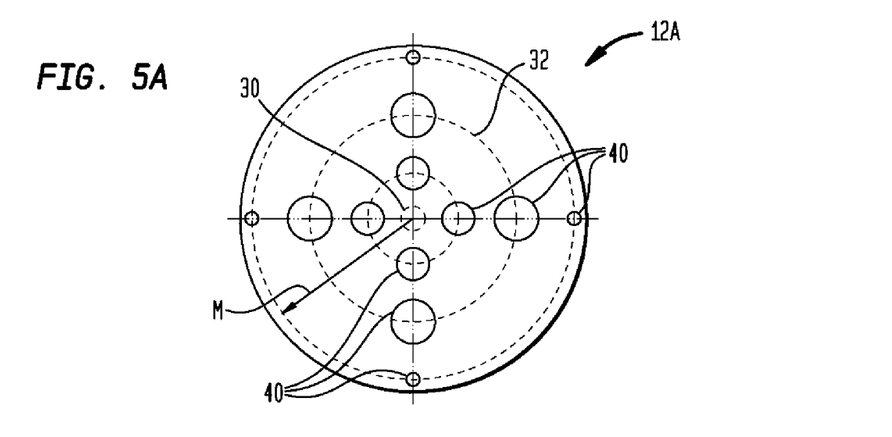
FIG. 5A is a plan view of an embodiment of an inlet face according to the present invention having discrete circular holes that are radially aligned in the inlet face's unbalanced flow region.
Figure 5B:
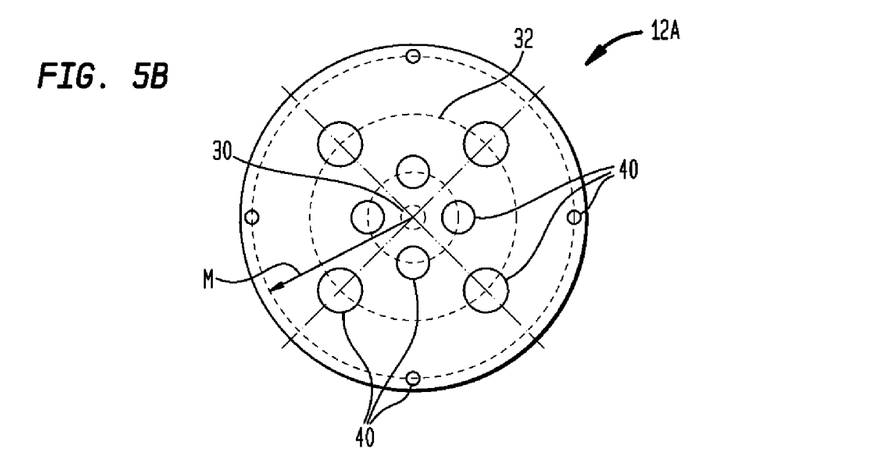
FIG. 5B is a plan view of another embodiment of an inlet face according to the present invention having discrete circular holes that are radially misaligned in the inlet face's unbalanced flow region.
Figure 5C:
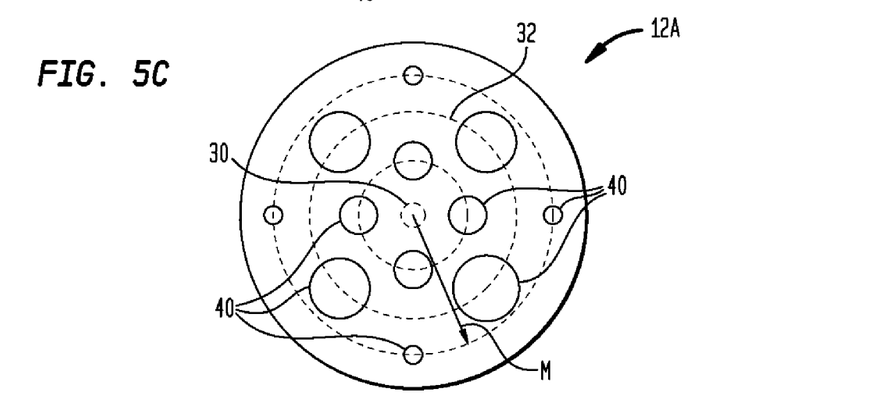
FIG. 5C is a plan view of yet another embodiment of an inlet face according to the present invention having discrete circular holes where the holes on one radius partially overlap the holes of an adjacent radius in the inlet face's unbalanced flow region.

FIGS. 5A-5C depict, in general, examples of different inlet faces 12A having hole pattern structures in unbalanced flow region 32 in accordance with the first category described above. That is, the examples are not necessarily representative of specific examples, but rather are illustrative of general hole positioning on a radius-to-radius basis. Each of these examples is based on the use of circular holes 40. For the illustrated examples where the same number of holes are located and are equally spaced on each radius of unbalanced flow region 32, the diameters of the holes increase toward some midpoint radius M, then decrease as radius approaches $R_{Pipe}$ to satisfy the unbalanced flow condition constraints defined above. For clarity of illustration, the location of midpoint radius M is not to scale. Holes may also be un-equally spaced and un-equally sized at each radius without departing from the scope of the present invention.

In general, there could be any number or shape of holes provided the above-described criteria for an unbalanced flow distribution are satisfied. By way of example, the diameter $D_i$ for uniform circular discrete holes centered on a given inlet face radius $R_i$ can be determined by the following relationship $$D_i = 2(A'_{Ri}/N\pi)^{1/2} \quad (9)$$

where $A'_{Ri}$ is the area of all holes centered on radius $R_i$, and

N is the preferred number of holes to be centered on radius $R_i$.

In FIG. 5A, the centers of holes 40 on each radius R are aligned with the centers of holes 40 of the other radii. In FIG. 5B, the centers of the holes 40 on each radius R are misaligned with respect to the centers of holes on adjacent radii. In each of FIGS. 5A and 5B, there is no overlap between holes centered on adjacent radii. However, in FIG. 5C, there is some overlap between holes 30 centered on adjacent radii.

Figure 6:
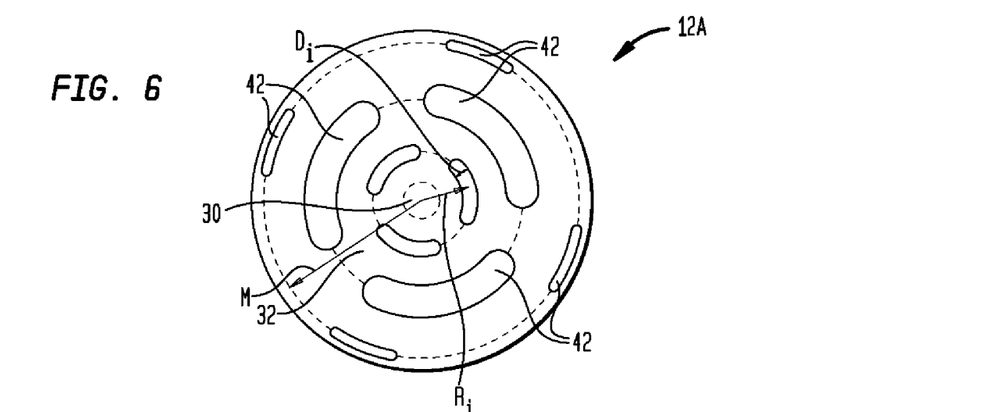
FIG. 6 is a plan view of another embodiment of an inlet face according to the present invention having discrete arc-shaped slots in the inlet face's unbalanced flow region.

FIG. 6 illustrates another example of a discrete-hole, first-category type of hole pattern structure where each hole is an arc-shaped slot 42 centered on a radius R. By way of example, each slot 42 has rounded (i.e., half circle) ends having a circular diameter D and a slot width of D. For a slot 42 centered on a radius $R_i$, the slot width $D_i$ is determined as follows $$D_i = (-\alpha R_i/90) + \{(32400 * A'_{Ri} + \alpha^2 R_i^2 \pi S)/(8100 n S)\}^{1/2} \quad (10)$$

where $\alpha = 360/2S$

S is the number of slots on a given radius $R_i$, and $A'_{Ri}$ is the combined area of all the slots centered on radius $R_i$.

The slots on a given radius can be equally or unequally spaced without departing from the scope of the present invention. Similar to the circular hole examples described above, slots on adjacent radii can be aligned or misaligned. Still further, the slots can be of different sizes of shapes provided they satisfy the unbalanced flow distribution criteria described herein above.

Figure 7A:
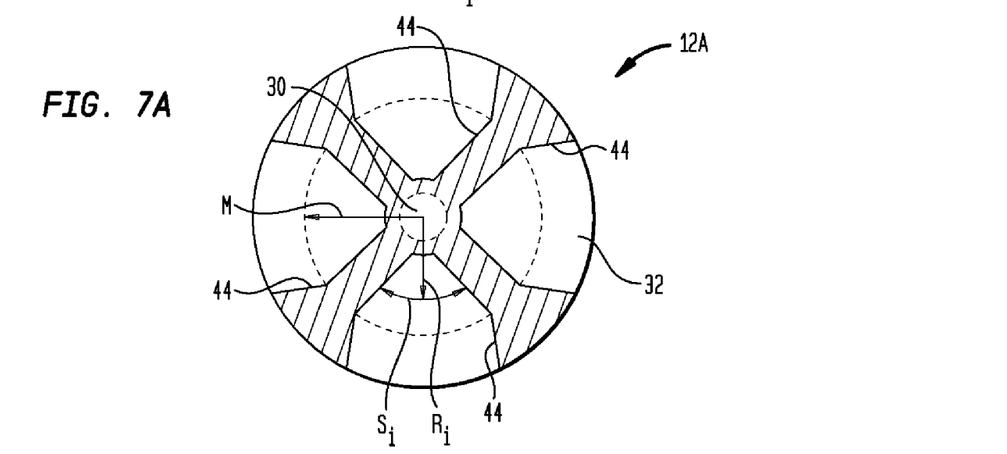
FIG. 7A is a plan view of one embodiment of an inlet face according to the present invention having holes that extend continuously across the inlet face's unbalanced flow region.
Figure 7B:
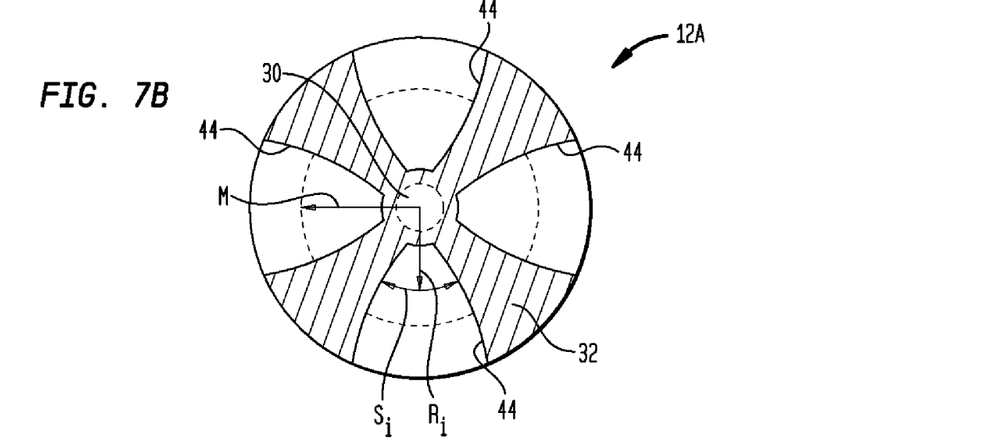
FIG. 7B is a plan view of another embodiment of an inlet face according to the present invention having holes that extend continuously across the inlet face's unbalanced flow region.

FIGS. 7A and 7B illustrate examples of inlet faces 12A having hole pattern structures in unbalanced flow region 32 in accordance with the above-described second category of hole pattern structures. Accordingly, each of the examples is based on the use of holes that extend continuously from central circular region 30 out to positions that are at the perimeter of unbalanced flow region 32 of inlet face 12A. Once again, the examples are not necessarily representative of specific examples, but rather are illustrative of general hole shape/positioning. For each example, each of holes 44 increase in area with increases in radial distance from central circular region 30 to some midpoint radius M, then decreases in area as the radius approaches the outer radius of unbalanced flow region 32. For each example, the radian angle $S_i$ at a radius $R_i$ can be determined from the following relationship $$S_i = \{A'_{Ri}/(2R_i + \Delta R) + A'_{(Ri+1)}/(2R_{(i+1)} + \Delta R)\}/2N\Delta R \quad (11)$$

where $\Delta R$ is the change in radial distance from $R_i$ to $R_{i+1}$, and

N is the preferred number of holes 44 to be formed in inlet face 12A.

It is to be understood that other approaches can be used to determine radian angle $S_i$ without departing from the scope of the present invention.

In each of the above-described embodiments of inlet face 12A, each hole in unbalanced flow region 32 is a fluid-entry hole that serves as the entrance to a corresponding fluid path through the plug body and ultimately to-and-through corresponding fluid-exit holes formed in the plug's outlet face. The patterns of the fluid paths are not limitations of the present invention as they can be straight, curved, helical, tapering in diameter, expanding in diameter, angled with respect to the direction of the fluid flow impinging on inlet face 12A, etc. Indeed, the patterns of the fluid paths can be used to enhance mixing at the plug's outlet face.

Figure 8:
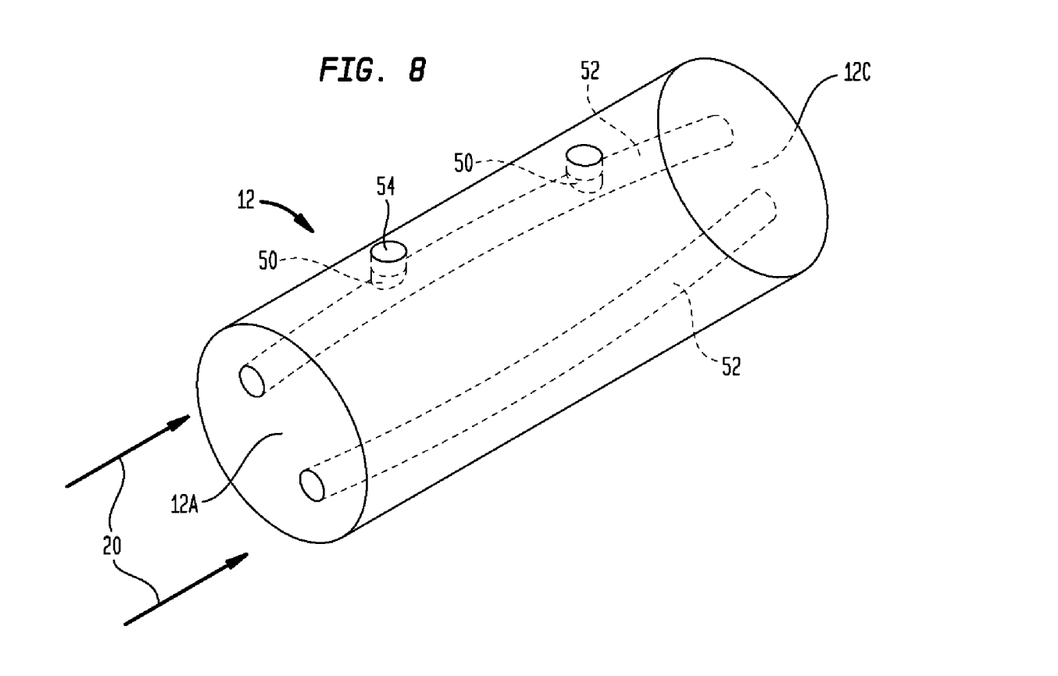
FIG. 8 is an isometric view of a fluid mixer configured for and instrumented with sensors for flowmetering in accordance with the present invention.

The fluid mixer plug of the present invention can be used "as is" to simply cause mixing within a fluid flow. However, the fluid mixing plug can also be "instrumented" with one or more sensors (e.g., temperature sensors, pressure sensors, etc.) in order to facilitate the measuring of process variables across the inlet face. To do this, one or more radially-extending holes can be drilled into the fluid mixer plug with each such radial hole extending to a fluid path. A sensor of choice can then be mounted flush with the sidewall of a fluid path. For example, FIG. 8 illustrates radial holes 50 (e.g., two are shown) leading from the perimeter of plug body 12B to a fluid path 52 that extends through plug body 12B. The particular shape of fluid path 52 is not a limitation of the present invention. A sensor 54 is mounted at the juncture of radial hole 50 with fluid path 52. Sensor 54 is typically positioned to be flush with the portion of plug body 12B that defines fluid path 52. Sensor 54 is typically a temperature or pressure sensor. Multiple holes/sensors can be used to establish measurement points anywhere along one or more of the fluid paths. The location of the sensors in the fluid path is critical for measurement of velocity profile changes due to entrance effects and accounting for the area change ratio for the standard orifice equation. As such, more than one sensor may need to be mounted in the same hole. By instrumenting fluid mixer plug 12 in this fashion, measurement hardware is kept completely out of the flow field. Note that traditional measurement schemes can also be combined with measurements made at the fluid mixer plug. Such traditional measurement schemes typically utilize measurements made upstream and downstream of the fluid mixer plug.

Radial hole(s) 50 can also be used to draw or pump another fluid into fluid path(s) 52 for mixing with fluid flow 20. More specifically, an empty hole 50 would have a vacuum created therein as fluid flow 20 moves through plug 12. This vacuum can be used to draw another fluid into fluid path 52. The additional fluid could also be pumped through hole 50 and into fluid path 52. Still further, when multiple radial holes 50 are provided, one or more could be instrumented with sensors and one or more could be left empty.

The advantages of the present invention are numerous. The hole entryways in the fluid mixer plug can be sized and positioned in a variety of ways to unbalance a fluid flow distribution across an unbalanced flow region of the plug's inlet face. This insures that the flow exiting the fluid mixer plug will experience mixing even in laminar (low flow) conditions. This approach is unique because both the natural flow distribution profile is disrupted, without significant pressure losses, and the resultant presence of eddy currents which aid mixing can be predicted. Flow exiting the fluid mixer will also experience mixing in high flow (high differential pressure) due to flow jet effects and eddy currents. Further, the present invention requires no moving parts to achieve fluid mixing. Still further, by mixing the fluid in this manner, the present invention will enhance heat transfer at and beyond the plug location when the fluid temperature differs from the temperature outside the conduit, or when the conduit is submerged in a bath. Thus, the present invention could also form an element of a heat exchanger. If needed, the fluid mixer plug can be instrumented for flowmetering. The present invention can be designed for and used in a wide variety of fluid flow applications.

Figure 9A:
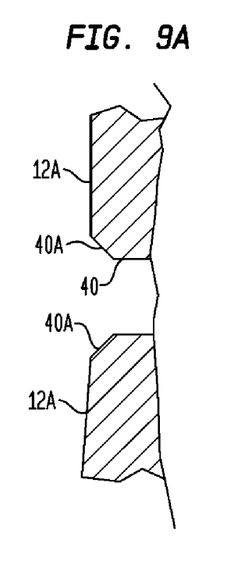
FIG. 9A is a cross-sectional view of a portion of a fluid mixer illustrating a beveled hole edge.
Figure 9B:
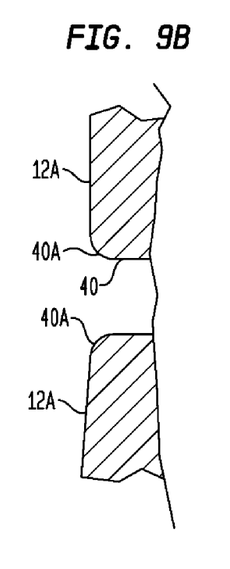
FIG. 9B is a cross-sectional view of a portion of a fluid mixer illustrating a contoured hole edge.
Figure 10A:
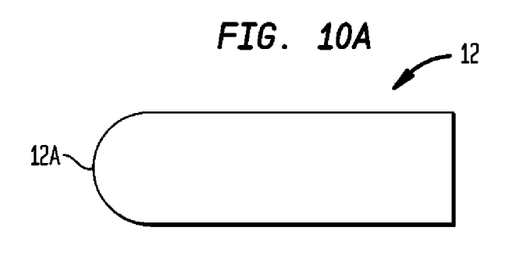
FIG. 10A is a side view of a fluid mixer having a contoured inlet face.
Figure 10B:
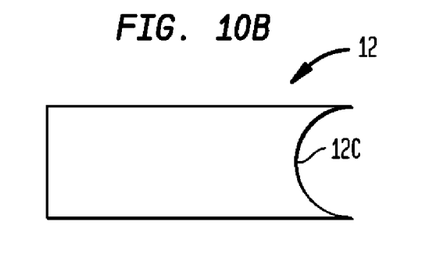
FIG. 10B is a side view of a fluid mixer having a contoured outlet face.
Figure 10C:
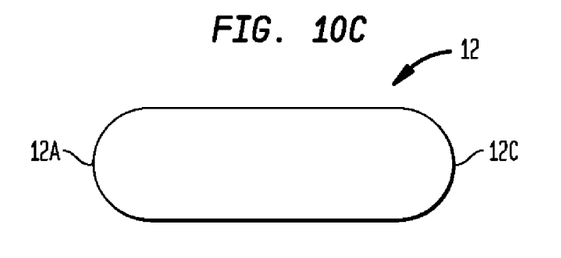
FIG. 10C is a side view of a fluid mixer having contoured inlet and outlet faces.
Figure 11:
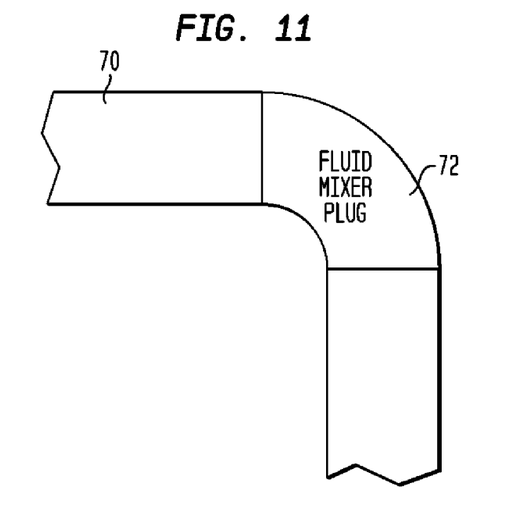
FIG. 11 is a schematic view of a fluid mixer shaped to conform to the curved shape of a conduit.

Although the invention has been described relative to a specific embodiment thereof, there are numerous variations and modifications that will be readily apparent to those skilled in the art in light of the above teachings. For example, the edges of the holes in the unbalanced flow region and central circular region of the fluid mixer plug can be sharp or tapered/beveled (as indicated by hole edge 40A in FIG. 9A), without departing from the scope of the present invention. In addition, the edges of the holes at the inlet face and/or outlet face of the fluid mixer plug can be rounded or contoured (as indicated by hole edge 40A in FIG. 9B), without departing from the scope of the present invention. Still further, the entire inlet face and/or outlet face of the fluid mixer plug can be contoured. Accordingly, FIG. 10A illustrates a fluid mixer plug 12 having a contoured inlet face 12A, FIG. 10B illustrates a fluid mixer plug 12 having a contoured outlet face 12C, and FIG. 10C illustrates a fluid mixer plug 12 having a contoured inlet face 12A and a contoured outlet face 12C. Such contouring can comprise simple convex or concave contours (as shown), or can comprise more complex contours without departing from the scope of the present invention. The fluid mixer plug of the present invention can also be shaped to conform to a curved conduit as shown in FIG. 11 where a fluid mixer plug 72 is shaped to conform to the curved shape of a conduit 70. It is therefore to be understood that, within the scope of the appended claims, the invention may be practiced other than as specifically described.

What is claimed as new and described to be secured by Letters Patent of the United States is:

1. A fluid mixer, comprising:
a flow-interrupting plug having a plurality of holes formed therethrough wherein a remaining portion is closed to fluid flow therethrough, said plug adapted to be fitted in a conduit supporting a fluid flow, said plug extending across a transverse portion of the conduit and sequentially defining, in terms of a direction of said fluid flow, (i) an inlet face, (ii) a plug body, and (iii) an outlet face,
said inlet face defining a central circular region and a ring-shaped region surrounding said central circular region,
said ring-shaped region including at least some of said remaining portion so-closed to fluid flow, said remaining portion at each radius R of ring shaped region satisfying a radius independent, flow-based relationship $$A_R = a/(X_R V_R^b)$$

where $A_R$ is a sum of areas of said remaining portion centered at said radius R,
$X_R$ is a flow coefficient at said radius R that is equal to $(\rho K)_R$ where $\rho_R$ is a density of a fluid that could flow through the conduit at said radius R and $K_R$ is a flow correction factor associated with the fluid that could flow through the conduit at said radius R,
$V_R$ is a velocity of the fluid that could flow through the conduit at said radius R,
b is a constant selected to make at least one process variable, associated with the fluid that is to flow through the conduit, approximately equal at each said radius R, and
a is a constant that is equal to $(X_R A_R V_R^b)$ at each said radius R; and
a plurality of entry openings defined in said inlet face in correspondence with said plurality of holes, said entry openings defining an open flow area at each said radius R of said ring-shaped region defined as $A'_R$, wherein $$A'_R = A_{Pipe} - A_R,$$

where $A_{Pipe}$ is the cross-sectional area of the conduit at said plug,
wherein, for each of said entry openings at each said radius R where R<M, said open flow area at radius R is greater than that at a radius $R_{Smaller}$ where $R_{Smaller}$<R, and
wherein, for each of said entry openings at each said radius R where R>M, said open flow area at radius R is less than that at a radius $R_{Larger}$ where $R_{Larger}$>R, and
where M is a radius in the range of approximately (0.4)$R_{Pipe}$ to (0.97)$R_{Pipe}$ where $R_{Pipe}$ is the radius of the conduit.

2. A fluid mixer as in claim 1, wherein said plug is shaped to conform to a curved portion of the conduit.

3. A fluid mixer as in claim 1, wherein said inlet face is contoured.

4. A fluid mixer as in claim 1, wherein said outlet face is contoured.

5. A fluid mixer as in claim 1, further comprising at least one radial bore extending from a radial edge of said plug to one of said plurality of holes.

6. A fluid mixer as in claim 5, further comprising a sensor fitted in said radial bore, said sensor being selected from the group consisting of temperature sensors and pressure sensors.

7. A fluid mixer as in claim 1, further comprising a plurality of radial bores extending from a radial edge of said plug to one of said plurality of holes.

8. A fluid mixer as in claim 7, further comprising a sensor fitted in at least one of said radial bores, said sensor being selected from the group consisting of temperature sensors and pressure sensors.

9. A fluid mixer as in claim 7, further comprising a sensor fitted in at least one of said radial bores, said sensor being selected from the group consisting of temperature sensors and pressure sensors, and at least one of said radial bores remaining open.

10. A fluid mixer as in claim 1, wherein at least a portion of said entry openings include beveled edges at said inlet face.

11. A fluid mixer as in claim 1, wherein each of said entry openings comprises a discrete opening fully bounded within said ring-shaped region.

12. A fluid mixer as in claim 1, wherein at least a portion of said entry openings comprises circular openings.

13. A fluid mixer as in claim 1, wherein at least a portion of said entry openings comprise arc-shaped slots.

14. A fluid mixer as in claim 1, wherein each of said entry openings extends radially outward from said central circular region and continuously through said ring-shaped region.

* * * * *